Figure 1:
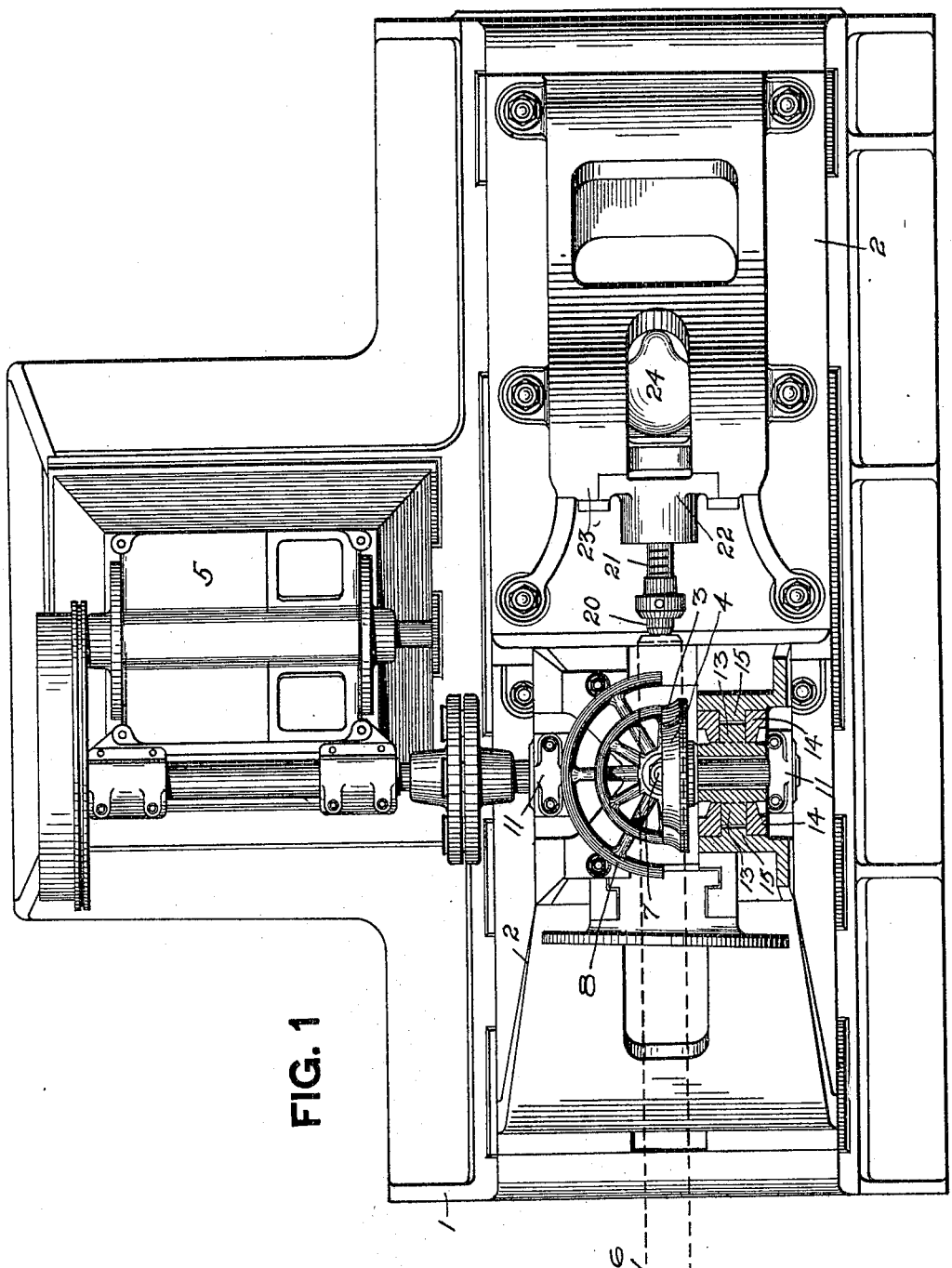

No. 812,226.

PATENTED FEB. 13, 1906.

P. C. PATTERSON.
DEVICE FOR OPERATING MANDREL BARS.
APPLICATION FILED FEB. 4, 1904.

3 SHEETS—SHEET 1.

WITNESSES.

INVENTOR.

No. 812,226. PATENTED FEB. 13, 1906.
P. C. PATTERSON.
DEVICE FOR OPERATING MANDREL BARS.
APPLICATION FILED FEB. 4, 1904.

3 SHEETS—SHEET 3.

WITNESSES.

INVENTOR.

UNITED STATES PATENT OFFICE.

PETER C. PATTERSON, OF McKEESPORT, PENNSYLVANIA, ASSIGNOR TO NATIONAL TUBE COMPANY, OF PITTSBURG, PENNSYLVANIA, A CORPORATION OF NEW JERSEY.

DEVICE FOR OPERATING MANDREL-BARS.

No. 812,226.     Specification of Letters Patent.     Patented Feb. 13, 1906.

Application filed February 4, 1904. Serial No. 192,020.

*To all whom it may concern:*

Be it known that I, PETER C. PATTERSON, a resident of McKeesport, in the county of Allegheny and State of Pennsylvania, have invented a new and useful Improvement in Devices for Operating Mandrel-Bars; and I do hereby declare the following to be a full, clear, and exact description thereof.

My invention relates to rolls for pulling or manipulating mandrel-bars of lapweld-tube-making apparatus.

The object of my invention is to increase the efficiency of devices of this kind and to reduce the amount of labor necessary to operate the same.

In the manufacture of lapweld-tubing the welding operation is performed between rolls provided with corresponding semicircular grooves, together with a ball-mandrel held in position between said rolls. This mandrel or ball during the welding operation is held in place by means of a bar having its forward end projecting into a seat in the ball and having its rear end held stationary by means of an abutment which can be moved out of the way when the welding is complete in order to withdraw the bar from the welded tube. The mandrel-bar passes between a pair of grooved rolls, which can be rotated in either direction, either to feed the bar forward or to withdraw the same, and which rolls bear on the bar sufficiently hard to move the same. The bar is subjected to rather severe usage and becomes dented and bent.

One feature of my invention consists in providing yielding rocking bearings for one of the mandrel-bar-operating rolls, so that said roll will adjust itself to irregularities in the bar and not cause a binding or wedging of the same.

The movable abutment inserted behind the mandrel-bar during the welding operation has heretofore been moved manually. In the case of "stickers," however, a severe thrust is imposed on the mandrel-bar, creating a large amount of friction against the abutment, so that it is difficult to move the latter. A considerable loss of time in moving said abutment frequently results therefrom, besides requiring additional labor.

Another feature of my invention consists in providing power mechanism for operating said abutment, and especially to move it out of contact with the mandrel-bar, thus dispensing with the loss of time and severe manual labor heretofore encountered.

The invention also comprises details of construction, which will be hereinafter described and claimed.

Figure 2:
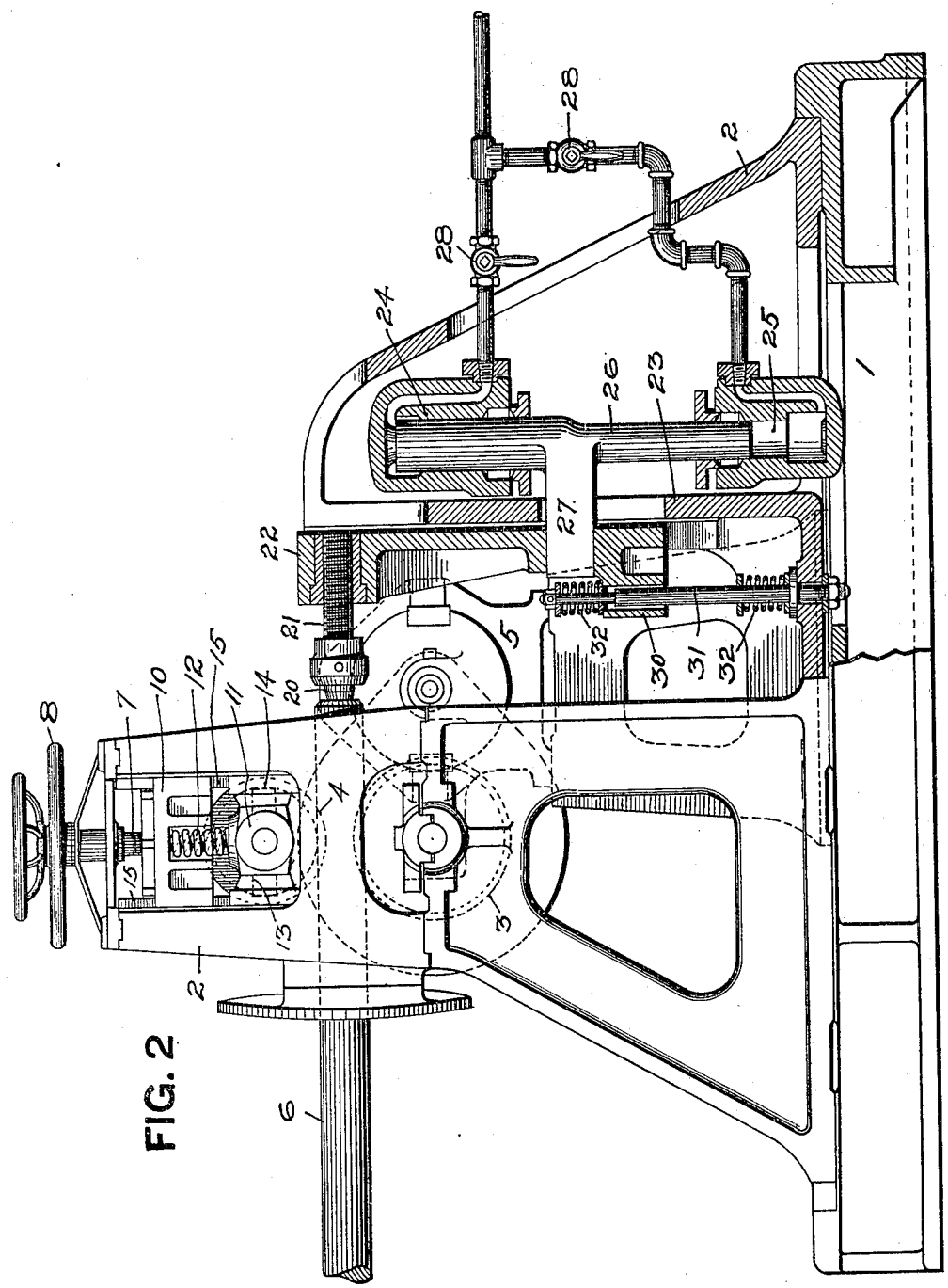
Figure 3:
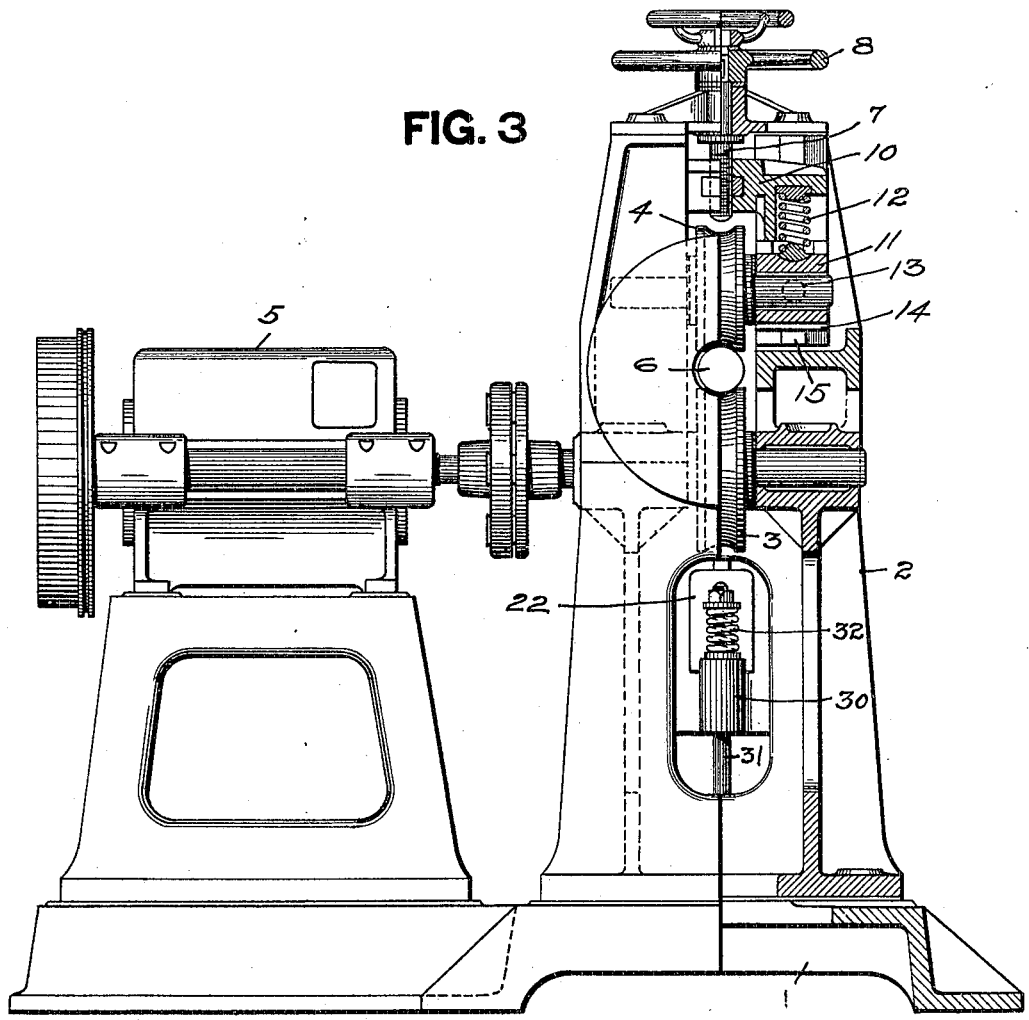

In the accompanying drawings, Figure 1 is a plan view of my apparatus, partly in section. Fig. 2 is a side view of the same, partly in section; and Fig. 3 is a front view of the same, also partly in section.

The apparatus comprises a suitable base-plate or frame 1 and vertical housings or frames 2, erected thereon. In these housings are mounted grooved rolls 3 and 4. The lower roll 3 is mounted in stationary bearings and is driven by any suitable reversing mechanism, such as the electric motor 5. The upper roll is vertically adjustable, so as to bring it into and out of contact with the mandrel-bar 6. This adjustment may be secured by any suitable mechanism. That shown comprises the usual screw 7 used for this purpose and operated by the hand-wheel 8. The screw 7 passes through the cap or saddle piece 10, which extends over both of the bearings 11 of the top roll. In order that these bearings and the roll may yield in order to adapt the roll to any irregularities in the mandrel, I provide yielding means, such as the springs 12, between the bearings and the saddle-piece. The bearings also are provided with trunnions 13, fitting in suitable openings in sliding pieces 14, which move on the ways 15 of the housings. As a consequence the bearings are perfectly free to rock or oscillate, thus permitting the roll to adapt itself to irregularities in the mandrel without subjecting the bearings or roll-shaft to unnecessary wear.

The stationary abutment for holding the mandrel in place comprises the usual pin 20, adapted to bear against the rear end of the mandrel and adjustably secured, by means of the screw 21, to a vertically-movable slide 22, mounted in suitable ways in the rear frame or housing 23. In order to move this slide into and out of position, and more especially out of position, I provide suitable power mechanism, that shown comprising a pair of power-cylinders 24 and 25, arranged vertically and having their pistons connected by a suitable rod 26, provided with a laterally-projecting arm 27, connected to the slide 22. The two pistons 24 and 25 are of different sizes, the larger one being employed for lowering the slide. These power-cylinders will be operated by any suitable pressure medium, such as steam or water, but preferably by compressed air, which may be admitted to the cylinders by ordinary controlling-valves 28. In operation pressure will preferably be maintained continuously in the cylinder 25, thus normally holding the abutment in position behind the mandrel. When it is desired to lower said abutment, the pressure may be released from the lower cylinder, but preferably this will not be done; but, on the contrary, pressure will be admitted into the upper cylinder 24, and as it is of greater power than the lower cylinder it will overbalance the latter, and thus lower the slide 22 and pin 20.

The slide 22 is provided with a perforated extension 30, slidably fitting the stationary guide bar or pin 31. This pin is provided with a pair of cushions or buffer-springs 32, one above and one below the extension 30 on the slide, these springs having for their function to cushion the slide at both its upward and downward movements.

In the use of my device the operation is practically the same as with prior machines of this kind. The mandrel-bar will be fed forward and back by reversing the rolls 3 and 4 and by pinching the bar between said rolls by means of the screw 7. By reason of the yielding and rocking bearings of the upper roll any irregularity in the mandrel-bar will not produce any binding or wedging in the rolls, but the action will be smooth and free. During the welding operation the mandrel is held in position by the abutment 20, which is held up in place by the power-cylinder 25. When the mandrel-bar is to be retracted, either after the welding operation or in the case of a sticker, pressure is admitted into the cylinder 24, thus positively moving the slide 22 downwardly and away from the rear end of the mandrel. When the mandrel has again been fed forward, pressure will be released from the cylinder 24 and the slide 22 will be automatically moved upwardly by the pressure in the cylinder 25 and into position behind the mandrel-bar.

Various changes may be made in the details of construction without departing from the spirit of my invention.

In the drawings the invention has been shown applied to rolls operating a single mandrel-bar. In some furnaces, however, double-grooved welding-rolls are used, and it is necessary to have two pairs of mandrel-bar-operating rolls side by side. In such case the apparatus shown will be duplicated.

What I claim is—

1. In apparatus for operating mandrel-bars, the combination with the housings, of a pair of grooved rolls mounted therein, movable bearings for one of said rolls, an adjustable saddle-piece, and springs between said saddle-piece and the movable bearings.

2. In apparatus for operating mandrel-bars, the combination with the housings, of a pair of grooved rolls mounted therein, movable bearings for one of said rolls, trunnions on said bearings, sliding bearings movable vertically in said housings and provided with seats for said trunnions, and adjusting means for said bearings.

3. In apparatus for operating mandrel-bars, the combination with the housings, of a pair of grooved rolls mounted therein, movable bearings in one of said rolls, trunnions on said bearings, sliding bearings vertically movable in said housings and provided with seats for said trunnions, adjusting means for said bearings, and springs between said bearings and adjusting means.

4. In apparatus for operating mandrel-bars, the combination of housings, positively-driven grooved rolls mounted therein, an abutment to the rear of said rolls and arranged to move vertically, and power mechanism connected to said abutment and arranged to positively draw the same downwardly, and to automatically raise the same.

5. In apparatus for operating mandrel-bars, the combination of housings, positively-driven grooved rolls mounted therein, a vertically-movable abutment to the rear of said rolls, and a vertical reciprocating motor connected to said abutment and arranged to positively draw the same downwardly and to automatically raise the same.

6. In apparatus for operating mandrel-bars, the combination with positively-driven grooved rolls, of a sliding abutment to the rear thereof, differential power-cylinders, rigidly-connected pistons for said cylinders, and connections from said pistons to said abutment for moving the same.

7. In apparatus for operating mandrel-bars, the combination with positively-driven grooved rolls, of a vertically-movable abutment to the rear thereof, vertically-arranged differential power-cylinders, and connections between the same and said abutment for raising and lowering the same.

8. In apparatus for operating mandrel-bars, the combination with driven grooved rolls of a vertically-movable abutment to the rear thereof, a motor connected to said abutment for raising and lowering the same, a guide-rod passing through an opening in said abutment, and cushioning-springs on said rod both above and below said abutment.

9. In apparatus for operating mandrel-bars, the combination with driven grooved rolls of a vertically-movable abutment to the rear thereof, a pair of vertically-arranged power-cylinders of different sizes, a piston-rod therefor, connections between the piston-rod and said abutment, means for maintaining constant pressure in the smaller of said cylinders, and means for admitting pressure to, and releasing same from, the larger of said cylinders.

In testimony whereof I, the said PETER C. PATTERSON, have hereunto set my hand.

PETER C. PATTERSON.

Witnesses:
 ROBERT C. TOTTEN,
 G. KREMER.